H. N. OTT AND F. H. BUFTON.
PROJECTION APPARATUS.
APPLICATION FILED NOV. 3, 1917.
1,341,666.
Patented June 1, 1920.
2 SHEETS—SHEET 1.
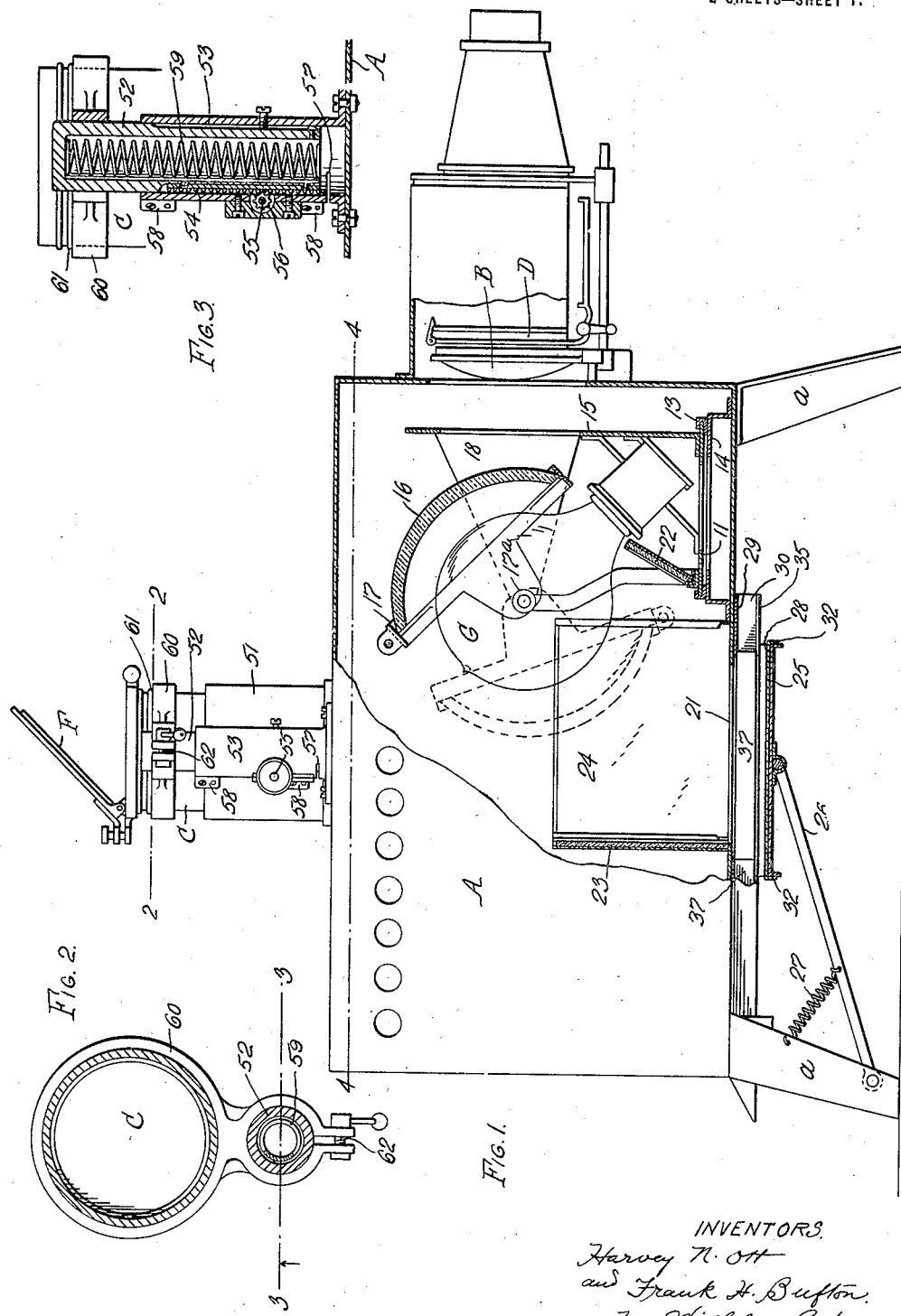
INVENTORS.
Harvey N. Ott
and Frank H. Bufton.
by Wilhelm Parker.
ATTORNEYS.

H. N. OTT AND F. H. BUFTON.
PROJECTION APPARATUS.
APPLICATION FILED NOV. 3, 1917.
1,341,666.
Patented June 1, 1920.
2 SHEETS—SHEET 2.
F1G.4.
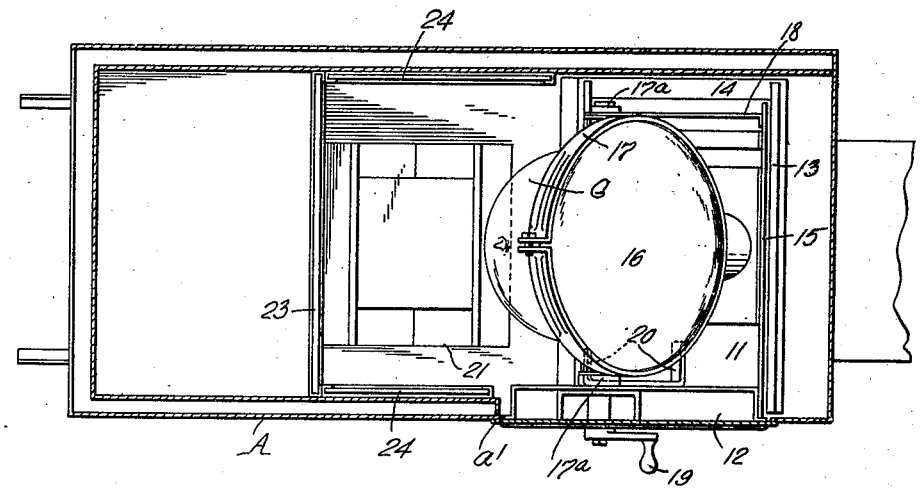
INVENTORS.
Harvey N. Ott,
and Frank H. Bufton.
By Wilhelm Parker.
ATTORNEYS.

UNITED STATES PATENT OFFICE.

HARVEY N. OTT AND FRANK H. BUFTON, OF BUFFALO, NEW YORK, ASSIGNORS TO SPENCER LENS COMPANY, OF BUFFALO, NEW YORK.

PROJECTION APPARATUS.

1,341,666. Specification of Letters Patent. Patented June 1, 1920.

Original application filed October 31, 1916, Serial No. 128,699. Divided and this application filed November 3, 1917. Serial No. 200,014.

*To all whom it may concern:*

Be it known that we, HARVEY N. OTT and FRANK H. BUFTON, citizens of the United States, residing at Buffalo, in the county of Erie and State of New York, have invented a new and useful Improvement in Projection Apparatus, of which the following is a specification.

This invention relates to projection apparatus more particularly of the sort used for projecting images from both transparent lantern slides or objects and opaque objects, such, for instance, as post cards and the like.

This application is a division of our application for patent filed October 31, 1916, Serial No. 128,699.

The object of the invention is to improve projection apparatus of this kind in various respects, among which may be specifically mentioned the following:

To provide illuminating means which illuminates to the best advantage either the opaque object or the lantern slide, and which can be readily manipulated or set for one or the other kind of projection.

In the accompanying drawings:

Figure 1 is a side elevation, partly in section, of a projection apparatus embodying the invention.

Fig. 2 is a sectional plan view, enlarged, on line 2—2, Fig. 1, showing the adjusting means for the objective for the opaque objects.

Fig. 3 is a sectional elevation thereof on line 3—3, Fig. 2.

Fig. 4 is a sectional plan view thereof on line 4—4, Fig. 1.

A represents the casing or light chamber of the apparatus. This casing may be of any suitable construction, preferably being a metal casing, provided with legs *a* for supporting it above a table or support and having at one side an opening *a'* through which a support carrying a lamp can be inserted into and removed from the casing. B represents the objective for the transparent lantern slides or objects, and C represents the opaque projection objective. The objective B for the lantern slides is arranged at the front end of the casing and the other objective C at the top of the casing. The former objective, as usual, has associated with it suitable means D for supporting the lantern slides. F represents an inclined mirror or reflector for directing the light rays forwardly from the objective C to the screen. The invention does not relate to the construction of these parts and they may be of any usual or suitable construction.

G represents an incandescent electric lamp or other usual or suitable source of light, which is preferably supported on a slide or carriage 11 arranged to slide into and out of the casing through the opening *a'* in the side thereof. This carriage is provided at its outer end with an upright double walled cover plate 12 adapted to close the opening *a'* when the carriage with the lamp is slid into place in the casing. The slide or carriage preferably consists of a horizontal metal plate arranged to slide in a guide-way 13 provided on a raised supporting plate 14 secured in the bottom of the casing. Holes are shown in this supporting plate, in the carriage and in the bottom of the casing beneath the supporting plate to afford proper ventilation. The lamp can be mounted on the carriage in any suitable manner. As shown, the carriage is provided with a transverse upright support or plate 15 to which the lamp socket is secured. 16 represents a mirror for reflecting light from the lamp onto the opaque object or post-card, which is supported as hereinafter described, face upward at the bottom of the casing beneath the objective C. The mirror is secured in a pivoted ring 17 which, as shown, is provided at opposite sides with journals 17ª arranged to turn in bearings in a bracket or support 18 and in the cover plate 12, and one of these journals projects out through a hole in the cover plate 12 and is provided at its outer end with a suitable handle 19 for swinging the mirror to and from its operative position shown by full lines in Fig. 1. By swinging the mirror to the position shown by dotted lines in Fig. 1, the light from the lamp is permitted to pass directly into the objective B for the transparent lantern slides. 20 indicates suitable stops for arresting the mirror in its two positions. In the position shown by full lines in Fig. 1, the mirror, which has a concaved spherical reflecting surface substantially concentric with the source of light, reflects the rays downwardly at the inclination indicated, onto the opaque object or post card, which is supported in or below an exposure opening 21 in the bottom of the casing. 22 indicates a mirror supported in front of the opening 21 on the lamp carriage beneath the lamp, and 23 and 24 indicate upright mirrors arranged at the rear and opposite sides of the opening 21 in the bottom of the casing for concentrating the light rays on the opaque object.

By locating the lamp and mirror 16 in the front portion of the casing between the lantern slide objective B and the axial line of the other objective C, the lamp is near the objective B where the direct rays from the lamp will illuminate the lantern slide to the best advantage when the mirror 16 is swung back out of the way, and the stationary mirrors 23 and 24 located, as shown, at the rear and sides of the opaque object can be larger than would otherwise be possible, so as to concentrate the maximum light on the object and insure a complete and brilliant illumination thereof. The illumination is much more perfect than is possible with a lamp located in the rear portion of the casing back of the opaque object.

The means for holding the opaque object or post card comprises a horizontal table or support which is mounted beneath the casing to move toward and from the opening 21 in the bottom of the casing, a frame or guide which is supported on this table, and separate holders in which the cards or opaque objects are held and which are adapted to be placed in the guide frame and shoved horizontally along the same into and out of operative position below the opening 21 in the bottom of the casing and through which the object is exposed. The table, which is shown at 25, preferably consists of a thin horizontal square metal plate having down-turned stiffening flanges, and is hinged in any suitable manner to the free ends of arms 26 which are pivoted at their other ends to the supporting legs $a$ or other stationary part of the projection apparatus. The table is adapted to swing with the supporting arms up and down toward and from the bottom of the casing and is held yieldingly up in the raised position by springs 27 connected to the arms 26 and to the legs of the casing. The guide frame is preferably made of sheet metal or thin metal plates and is composed of a horizontal bottom plate 28 of substantially the size of the table and adapted to rest thereon, and a top plate 29, the opposite sides of which are bent down to form the sides 30 of the frame and are suitably secured to up-turned flanges at the sides of the bottom plate. The bottom plate is provided at opposite ends with down-turned flanges 32 adapted to straddle the table 25 to prevent endwise shifting of the guide frame on the table, and the guide frame is also preferably provided at its front or near side with a depending flange which is adapted to engage the corresponding edge of the table to properly position the frame on the table and prevent it from being shoved back out of the intended position. The top plate 29 of the frame is provided with a square opening which registers with the opening 21 in the bottom of the casing for the exposure of the object or card. The sides of the frame are provided with inwardly extending horizontal flanges 35 which form guides or tracks on which the card holders are adapted to be placed and slid through the guide frame. The rear ends of the sides of the guide frame with the tracks 35 preferably extend outwardly beyond the top plate so that the holders can be more readily placed on the guide tracks and shoved into the guide frame.

37 represents one of the separate holders for the cards or opaque objects. A plurality of these holders, preferably three, is supplied with the apparatus. A card or opaque object is placed in each holder and one holder is placed in the rear end of the guide frame. The next holder is then placed in the frame and shoved forwardly so as to push the first holder into position beneath the opening 21 in the bottom of the casing for exposing the picture or subject thereon. When it is desired to remove this subject and replace it with another one, a third holder is placed in the rear end of the frame and shoved forwardly, thereby shoving the second holder into position beneath the exposure opening and shoving the first holder out of the front end of the frame, where the operator can readily grasp it and remove it from the machine. This construction enables the operator to stand at the near or front side of the apparatus and readily place the card holders in the guide frame with one hand and remove them with the other hand without having to reach under or around the casing to the far side to reach the holders, as in apparatus in which the holders move transversely of the case. This is a decided advantage since the operator does not have to get close to the apparatus, which is hot, and is not liable to be burnt. Each of the card holders is preferably constructed as disclosed in our aforementioned application. The card or other object can be readily placed in the holder when the latter is removed from the guide frame, where it can be readily handled and the card adjusted therein, and after the card is placed in the holder it is securely retained in position thereon and the holders can be readily slipped into and out of the guide frame and moved into and out of position for exposure, as above explained.

The projection objective C for the post cards or opaque objects is adjustable vertically for properly focusing it and for this purpose the objective is arranged to slide vertically in a guide tube 51 fixed on top of the casing A. The lens tube with the lenses of this objective and the mirror carried thereby are frequently large and heavy and if the usual rack and pinion arranged at one side of the lens tube are employed for adjusting the objective, the weight of the parts will cause them to lower and prevent them from being held stationary in the adjusted position unless the friction of the adjusting mechanism is so great as to be objectionable in use. On account of the large diameter of the lens tube, it is also liable to bind in its guide and make the adjusting mechanism work hard. In order to overcome these objections and provide means which can be readily and easily operated for adjusting the objective and which will insure the holding of the same in adjusted position, the following construction is employed: 52 represents a vertical plunger or post arranged to slide vertically in a cylinder or tubular guide 53 fixed in any suitable manner on top of the casing A at one side of the objective. The post is provided at one side with a toothed rack 54, and an adjusting shaft 55 suitably journaled on the guide cylinder is provided with a pinion 56 meshing with the rack for raising and lowering the post. Any other suitable means for adjusting the post may be substituted. The adjusting shaft is provided at its outer end with a finger wheel or other means for turning it. The guide cylinder is preferably slotted transversely at its lower portion as indicated at 57 and is split longitudinally above this slot to permit it to be contracted on the post sufficiently to create the desired friction to oppose the movement of the post. The split portion of the guide tube, as shown, is provided with ears or lugs 58 connected by screws for contracting it on the post. The post is made hollow and a spring 59 inclosed therein between the top of the casing and the upper end of the post tends to lift the post and the parts connected therewith and to yieldingly resist the descent of the same. The post is connected to the lens tube of the objective C, or otherwise associated therewith in any suitable manner, so that the weight of the lens tube and the parts thereon is carried by the adjusting post, and the objective is adjusted by the adjustment of the post. As shown, a connecting ring 60 surrounds the lens tube below a lip or collar 61 thereon and is provided with a split clamping portion which embraces the upper end of the adjusting post and is clamped thereon as by means of a screw 62. This clamp can be readily secured to the post at the required elevation with reference to the lens tube. By this arrangement the spring 59 tends to lift the post and the objective connected thereto and to oppose the descent of these parts. By using a spring which substantially counterbalances the weight of the post and parts connected thereto, the adjusting gear can be turned easily and the parts will nevertheless be supported in the adjusted position without the likelihood of lowering from this position under the force of gravity. Since the adjusting post is of small diameter it is not apt to bind in its guide cylinder and it properly guides the objective. This arrangement also enables the adjusting shaft to be placed lower in a more convenient position than it could be placed on the objective guide tube.

We claim as our invention:

1. In a projection apparatus, the combination of a light casing, means for supporting an opaque object at the lower portion of the casing, a projection objective at one end of the casing, a projection objective at the upper portion of the casing, a source of light arranged in the casing adjacent to said first mentioned objective and between the same and the axial line of said other objective, and a reflector for reflecting light onto said object and arranged to move to and from a position in which it is between the source of light and said first mentioned objective.

2. In a projection apparatus, the combination of a light casing, means for supporting an opaque object at the lower portion of the casing, a projection objective at one end of the casing, a projection objective at the upper portion of the casing, a source of light arranged in the casing adjacent to said first mentioned objective and between the same and the axial line of said other objective, and a concaved mirror for reflecting light onto said object, said mirror being mounted to swing to and from an operative position between the source of light and said first mentioned objective.

3. In a projection apparatus, the combination of a light casing, means for supporting an opaque object at the lower portion of the casing, a projection objective at one end of the casing, a projection objective at the upper portion of the casing, a source of light arranged in the casing in line with said first mentioned objective and between the same and the axial line of said second mentioned objective, and a concaved mirror mounted to move to and from an operative position in which it reflects rays of light onto said opaque object and intercepts the direct rays from said source of light to said first mentioned objective.

4. In an optical projection apparatus, the combination with a holder for transparent objects, a holder for opaque objects, two objectives one arranged for coaction with each object holder, and a light source positioned between the two object holders to illuminate either of them, of an adjustable shutter movable about the light source from a position between the opaque object holder and its coacting objective, adapting the apparatus for transparent object projection, into a position between the light source and the transparent object holder to adapt the apparatus for opaque object projection.

5. In an optical projection apparatus, the combination with a holder for transparent objects, a holder for opaque objects, two objectives one arranged for coaction with each object holder, and a light source positioned between the two object holders to illuminate either of them, of a combined shutter and reflector movable about the light source from a position between the opaque object holder and its coacting objective, adapting the apparatus for transparent object projection, into a position between the light source and the transparent object holder to adapt the apparatus for opaque object projection.

Witness our hands, this 31st day of October, 1917.

HARVEY N. OTT.
FRANK H. BUFTON.

Witnesses:
EDWARD E. TROST,
HENRY SANDMANN.